Figure 1:
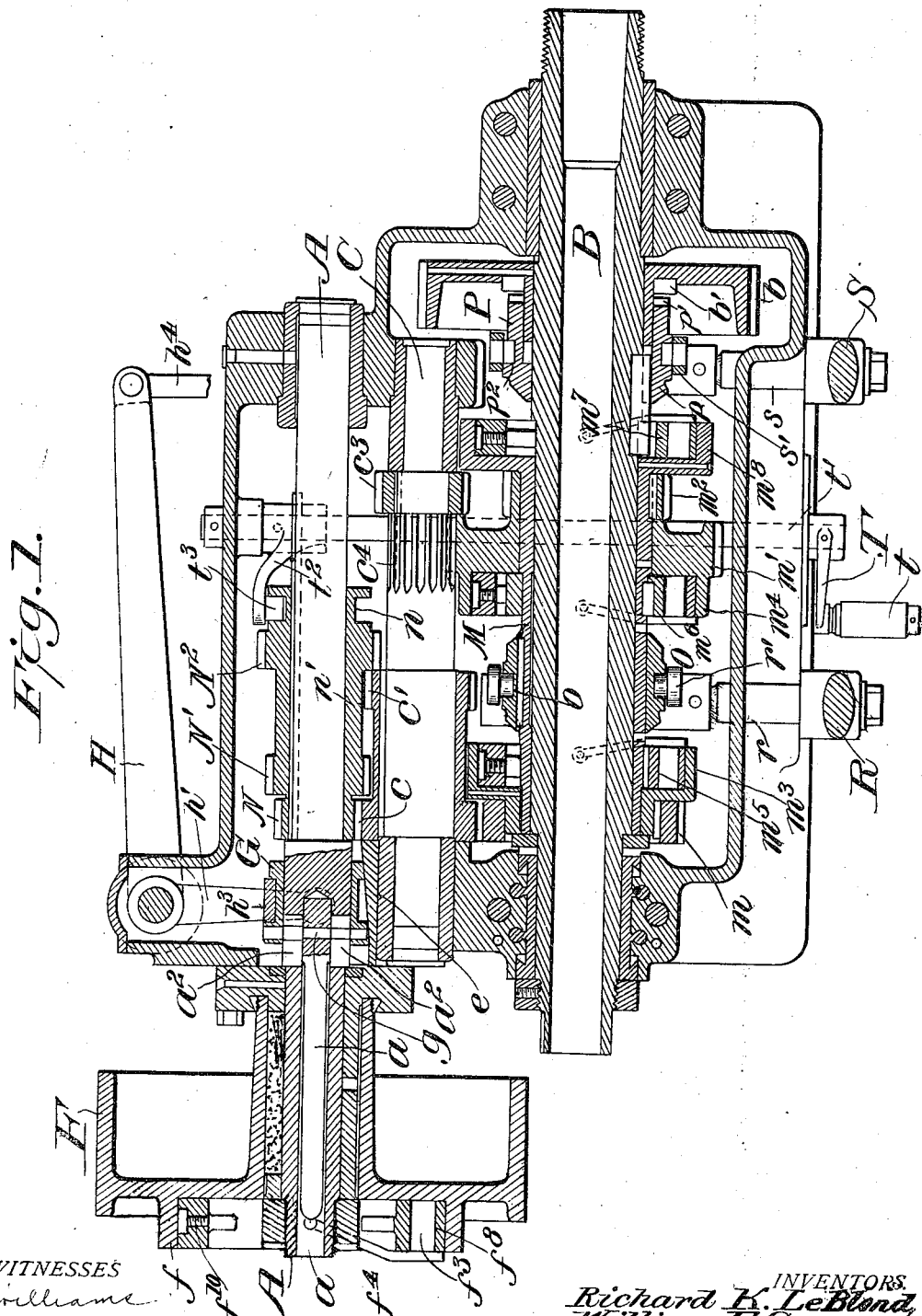

R. K. LE BLOND & W. F. GROENE.
GEARING.
APPLICATION FILED APR. 12, 1913.

1,203,751.

Patented Nov. 7, 1916.
4 SHEETS—SHEET 1.

WITNESSES

INVENTORS.
Richard K. LeBlond,
William F. Groene.
By Robt. P. Hains
Attorney

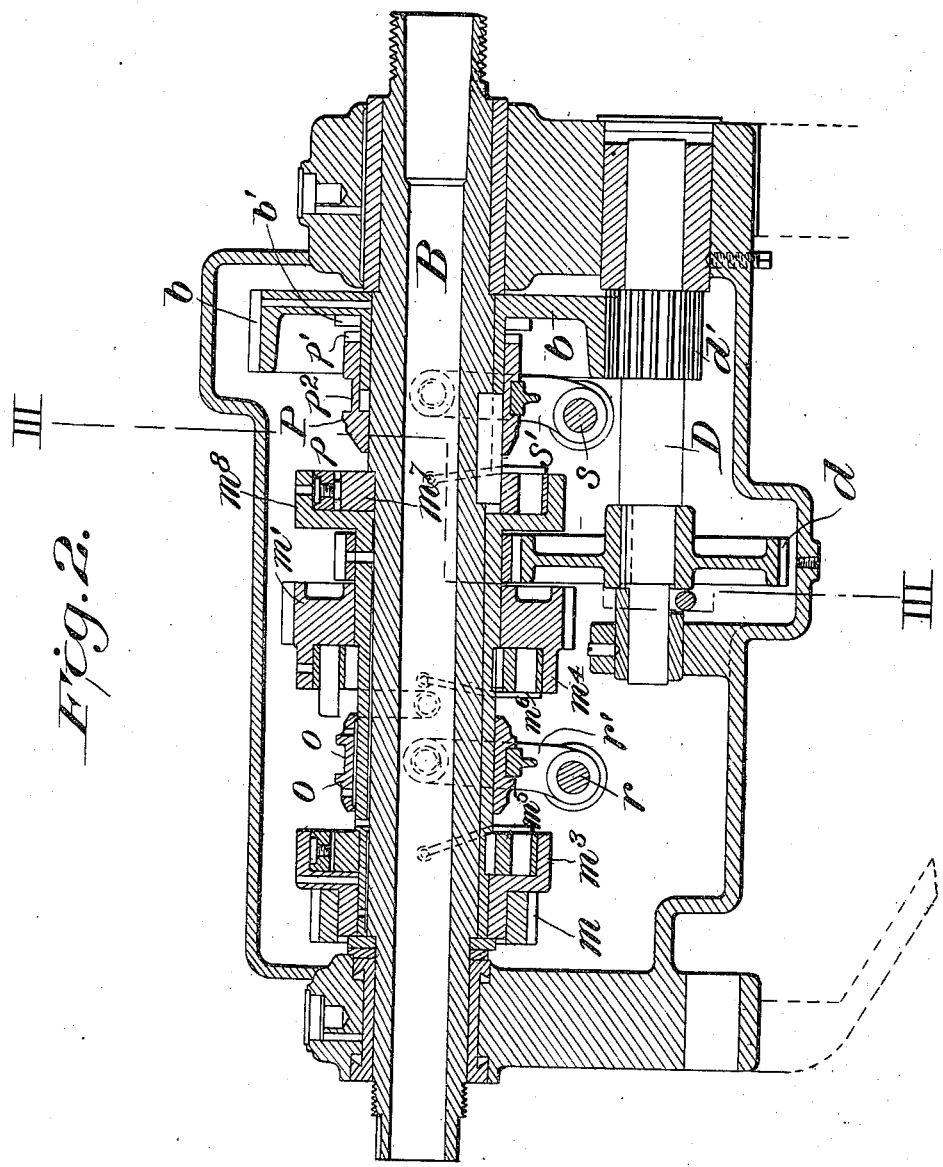

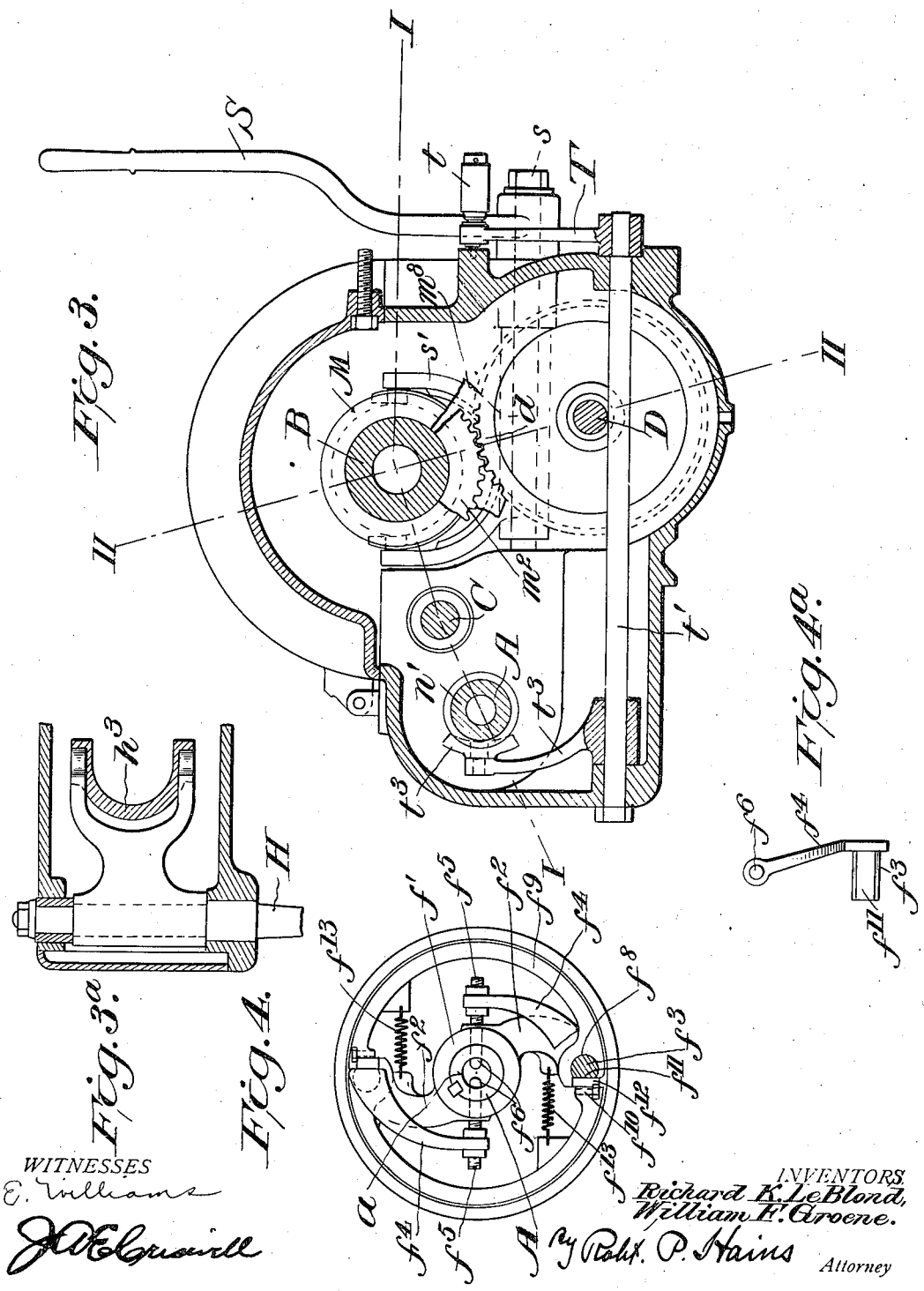

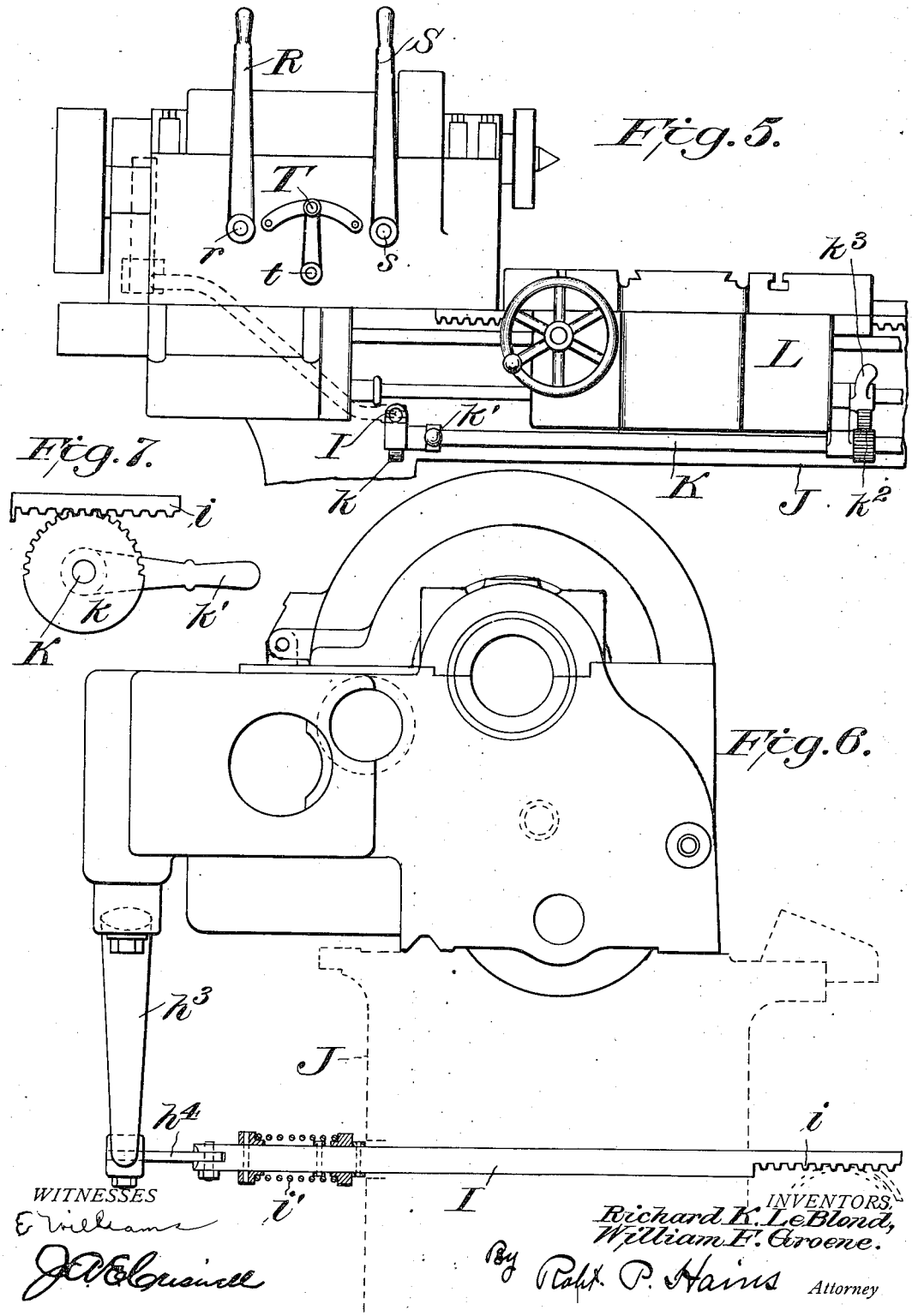

UNITED STATES PATENT OFFICE.

RICHARD K. LE BLOND AND WILLIAM F. GROENE, OF CINCINNATI, OHIO, ASSIGNORS TO THE R. K. LE BLOND MACHINE TOOL COMPANY, OF CINCINNATI, OHIO, A CORPORATION OF OHIO.

GEARING.

1,203,751.            Specification of Letters Patent.           Patented Nov. 7, 1916.

Application filed April 12, 1913. Serial No. 760,670.

*To all whom it may concern:*

Be it known that we, RICHARD K. LE BLOND and WILLIAM F. GROENE, citizens of the United States, residing at Cincinnati, county of Hamilton, and State of Ohio, have invented certain new and useful Improvements in Gearing, of which the following is a full, clear, and exact specification.

This invention relates to machine lathes of the type having a single pulley and an all geared headstock.

One object of our invention is to provide improved and simplified means whereby the driving pulley may run loose when the lathe is not running and the gearing be simultaneously locked, or said gearing unlocked and the pulley connected up therewith by a single operation under easy control and within convenient reach of the operator.

Another object is to simplify and improve the gearing, providing many speeds and means for effecting the changes from one to another which may be actuated and adjusted readily without loss of time.

Other objects will appear as the description proceeds.

The invention will first be hereinafter described in connection with the accompanying drawings, which constitute a part of this specification, and then set forth more specifically in the claims at the end of the description.

In the accompanying drawings, in which like parts are indicated by similar reference characters throughout; Figure 1 is a longitudinal sectional view taken on the line I—I of Fig. 3, centrally of the driving shaft and pulley, the intermediate or counter shaft and the spindle; Fig. 2 is a longitudinal sectional view taken on the line II—II of Fig. 3, centrally of the spindle and back gear shaft; Fig. 3 is a cross section on the line III—III of Fig. 2; Fig. 3ª is a detail sectional view showing the bifurcated lever arm for actuating the friction clutch on the driving pulley; Fig. 4 is a detail end view of the driving pulley, to illustrate the friction clutch for connecting said pulley to the driving shaft; Fig. 4ª is a detail view of one of the levers for actuating the friction clutch on the driving pulley; Fig. 5 is a front elevation of the headstock and part of the lathe bed adjacent thereto; Fig. 6 is an end view of the headstock with the driving pulley removed the bed being shown in broken lines and the longitudinally movable bar which passes through the bed for coupling the driving pulley to the driving shaft being shown in solid lines, and Fig. 7 is a detail of the rack and pinion connection at the front end of said bar.

Referring more particularly to the drawings, A designates the driving shaft, B the spindle, C an intermediate shaft, and D the back gear shaft, all of which are suitably journaled and properly positioned in the headstock casing E, whereby the spindle may be driven at various speeds as hereinafter described. The outer end of the driving shaft A projects beyond the casing E and carries a loose driving pulley F over which a belt (not shown) may run from a source of power. Said pulley may be locked to the driving shaft by means of a friction clutch housed by a flange $f$ on the pulley. The friction clutch, as shown best in Figs. 1 and 4, may comprise a collar $f'$ keyed to the shaft and having oppositely extending arms $f^2$ terminating adjacent to the inner surface of the flange $f$. The outer end portions of said arms are bored axially to receive projecting lugs $f^3$ on levers $f^4$, the other ends of which carry pins $f^5$ preferably arranged in the same plane and extending through suitable apertures in the collar $f'$ and the shaft to the interior of the axial bore $a$ of said shaft. The inner terminals of said pins are spaced apart and rounded, as at $f^6$. The lugs $f^3$ are also fitted to turn in the forks $f^8$ at corresponding ends of segmental friction bands or shoes $f^9$ normally fitting loosely within the flange $f$. The other ends $f^{10}$ of said shoes terminate adjacent the lugs $f^3$ which have flat faces $f^{11}$ presented to said ends $f^{10}$ and preferably separated therefrom by hardened steel bearing blocks $f^{12}$. In view of this construction, the turning of the levers $f^4$ will cause the corners of the flat faces $f^{11}$ to protrude, forcing the bearing blocks and free ends of the shoes away from their forked ends, thereby expanding said shoes so as to clamp them to the flange $f$, and thus lock the pulley to the driving shaft. When said levers are released, they are automatically returned to normal position, and the shoes are simultaneously drawn inward, out of contact with the flange $f$, by springs $f^{13}$ connected to the levers and opposite shoes, as clearly shown in Fig. 4.

Within the bore $a$ of the driving shaft there is a clutch operating plunger $a'$ having its outer end tapered to coöperate with the rounded ends of the pins $f^5$, a spool G, mounted to slide on the driving shaft, is connected to the plunger $a'$ by a pin $g$ working in a slot $a^2$ in said shaft. The spool is turned tapering, and the headstock casting or casing is correspondingly bored, as at $e$, so that while an outward movement of said spool G and plunger will spread the pins $f^5$ and operate the friction clutch to lock the pulley to the shaft, as already described, an inward movement of said spool will not only withdraw the plunger, thereby releasing the clutch, but also absolutely lock the shaft by means of the braking action of said tapered portions of the spool and headstock casting.

The spool G is actuated by a lever H pivoted at $h$. One arm $h'$ of said lever has a bifurcated end $h^2$ which carries a yoke $h^3$ engaging the spool, see Fig. 3$^a$, while the other arm $h^3$ of the lever is connected by means of a link $h^4$ with a bar I which passes through the bed J of the lathe and has a rack $i$ on its end portion projecting at the front of said bed. This rack is engaged by a gear $k$ fast on a rock shaft K extending the full length of the bed. Said rock shaft K has fixed to it a lever $k'$ (see Figs. 5 and 7) for manipulating said shaft, and also has another set of gears $k^2$ and lever $k^3$ on the apron L for the same purpose. From the foregoing it is evident that the turning of the shaft K by either of the levers $k'$ or $k^3$ will actuate the lever H through the medium of the bar I which is moved endwise by the gear $k$ meshing with the rack $i$ and that the actuation of said lever will move the spool G in or out, either locking the driving pulley to its shaft for turning the lathe, or releasing said pulley and locking the lathe against turning. Thus the lathe may be started or stopped and locked by the operator either at the apron or at the headstock, which is a matter of great convenience and saving of time. A resilient buffer $i'$ may be used to advantage on the rear end portion of the bar I, as illustrated in Fig. 6.

The headstock as herein shown and described is so geared that the spindle B may be driven at twelve different speeds by the use of gears mounted on the driving shaft A, on the intermediate shaft C and back gear shaft D, and also on a sleeve M loosely mounted around the spindle. In the first place, the driving shaft has three cluster gears N, N' and N² splined thereon and adapted to engage separately with gears $c$, $c'$ and $c^3$ fast on the intermediate shaft C, Fig. 1. The gear $c$ is constantly in mesh with a small gear $m$ loose on the sleeve M. The intermediate shaft also carries a fourth gear $c^4$, cut into the same and constantly in mesh with a large gear $m'$ loose on the sleeve M. In addition to the gears $m$ and $m'$ the sleeve carries a small gear $m^2$ which is keyed thereto. The spindle itself carries a large gear $b$ loose thereon.

The back gear shaft D, Fig. 2, carries two gears which are fast thereon. The larger of these gears, $d$, is constantly in mesh with the small gear $m^2$, fast on the sleeve M, while the other gear $d'$ on said back gear shaft, is constantly in mesh with the large gear $b$ which is loose on the spindle. The gears $m$ and $m'$, on the sleeve M, have flanges $m^3$ and $m^4$, respectively, arranged on their facing sides and spaced away from the sleeve. Within said flanges, friction clutches $m^5$ and $m^6$ are respectively arranged. Said clutches may be similar to the one already described for locking the driving pulley F to the driving shaft A, or of any other suitable construction. Intermediate of said gears $m$ and $m'$ on the sleeve there is mounted a spool O splined to said sleeve and having conical or tapered ends adapted to operate the friction clutches in the flanges $m^3$ and $m^4$ of said gears for selectively locking the latter to the sleeve.

From the foregoing it will be seen that the sleeve M may be driven at six different speeds, three through the gear $m$ and three through the gear $m'$, by reason of the three cluster gears N, N' and N² on the driving shaft, the corresponding gears $c$, $c'$ and $c^3$ on the intermediate shaft, and the meshing of the gear $c$ with the gear $m$, and the gear $c^4$, on said intermediate shaft, with a gear $m'$. Now any one of these six speeds of the sleeve may be communicated directly to the spindle by means of a friction clutch $m^7$ arranged in a flared flange $m^8$ on the end of the sleeve, said clutch being operated by the conical or tapered end $p$ of a spool P splined on the spindle.

Six additional speeds, making twelve in all, may be employed by using the back gear shaft and its gears. It will be observed that whenever the sleeve M turns, the back gear shaft is turned with it on account of the constant meshing of the gear $m^2$, which is fast on said sleeve, with the back gear $d$ and that whenever said back shaft D turns the large gear $b$, which is loose on the spindle, is rotated by reason of the constant meshing of the back gear $d'$ with said gear $b$. Now, the gear $b$ is provided with a positive clutch element $b'$ adapted to mesh with a clutch element $p'$ on the adjacent end of the spool P, so that when said spool is moved away from the friction clutch $m^7$ of the sleeve M and so as to bring the clutch element $p'$ into mesh with the clutch element $b'$ the gear $b$ will be locked to the spindle, and the latter driven through said back gears.

The spools O and P may be shifted by hand levers R and S, respectively, arranged at the front of the headstock and connected to rock shafts $r$ and $s$ which also carry yokes $r'$ and $s'$ attached to their free ends and engaging grooves $o$ and $p^2$, respectively, in said spools. The cluster gears N, N' and N² are shifted by a lever T which may be provided with a crank handle $t$ and arranged intermediate of the levers R and S on the front of the headstock, see Figs. 1 and 5. Said lever T is attached to a rock shaft $t'$ carrying an arm $t^2$ having a shoe $t^3$ engaging in a groove $n$ in the cluster gear casting $n'$.

Having thus fully described our invention what we claim as new and desire to secure by Letters Patent of the United States is:

1. In a machine of the character described, the combination of a drive shaft, driving means for said shaft, a spindle, shiftable gearing connection between the drive shaft and spindle, means for operatively connecting and disconnecting the drive shaft with its driving means, and means acting when the drive shaft is disconnected from its driving means to stop rotation of the gearing connecting the drive shaft and spindle.

2. In a machine of the character described, the combination of a drive shaft and its driving means, a spindle, an intermediate shaft between the drive shaft and spindle, shiftable gearing connection between the drive shaft, intermediate shaft and spindle for transmitting motion of the drive shaft in different speeds to the spindle, means for disconnecting the drive shaft from its driving means, and means for stopping the operation of the gearing connection between the said shafts when the driving means is disconnected from the drive shaft to prevent overrunning.

3. In a machine of the character described, the combination of a drive shaft and its driving means, a cluster of shifting gears on the drive shaft, an intermediate shaft having a series of gears selectively engageable with the gears on the drive shaft, a spindle, selectable gearing connection for rotating the spindle from the intermediate shaft, means for detachably connecting the driving means with the drive shaft, and means acting to arrest rotation of the cluster of shiftable gears when the driving means is disconnected from the drive shaft to permit the shiftable gears to be shifted for changing speed as soon as the driving means is operatively disengaged from the drive shaft without loss of time.

4. In a machine of the character described, the combination of a drive shaft, an intermediate shaft, a spindle, and a back shaft, selective gearing connection between the drive shaft and intermediate shaft, a sleeve on the spindle revoluble independently thereof, means for detachably locking the sleeve to the spindle, loose connection between the intermediate shaft and sleeve, means for rendering said gearing connection functionally operative or inoperative, permanent gearing connection between the sleeve and back shaft, and loose gearing connection between the spindle and back shaft, and means for rendering said gearing connection functionally operative.

5. In a machine of the character described, the combination of a driving shaft, a sleeve splined thereon, a cluster of gears fast thereto, an intermediate shaft, a plurality of gears fast thereon, means for moving the cluster of gears on the driving shaft to cause selective engagement between gears on the driving shaft and intermediate shaft, a spindle, a sleeve on the spindle independently revoluble thereof, gears on the sleeve independently revoluble thereof and in continual mesh with gears on the intermediate shaft, locking means between the sleeve and gears that they may be caused to revolve with the sleeve, a gear fast to the sleeve, a gear loose on the spindle, means to cause the sleeve or the loose gear to revolve with the spindle, and a back shaft with gears fast thereon and in continual mesh with the gear fast to the sleeve and the gear normally loose on the spindle respectively, whereby fine changes of speed may be secured from the driving shaft and varying speeds may be imparted to the spindle.

6. In the head stock of a machine of the character described, the combination of a driving shaft, a sleeve splined thereto and susceptible of longitudinal movement thereof, said sleeve having three gears fast thereon, an intermediate shaft, four gears fast thereon, means to selectively enmesh the gears on the sleeve with three of the gears on the intermediate shaft through longitudinal movement of the sleeve, a spindle, a sleeve thereon independently revoluble thereof, two gears upon the sleeve independently revoluble thereof and in continual mesh with gears on the intermediate shaft, a gear fast on the sleeve, a gear loose on the spindle, means to lock the one or the other to the sleeve and spindle respectively, and a back shaft with two gears fast thereon, one in continual mesh with the gear fast to the sleeve and the other in continual mesh with the gear loose on the spindle.

7. The combination with a support, of a driving shaft, a cluster of gears splined thereon, an intermediate shaft, a plurality of gears fast thereon, certain of said gears on the intermediate shaft being adapted to separately mesh with the gears of the cluster on the driving shaft, a spindle, a sleeve loosely mounted thereon, two gears loosely mounted on said sleeve and constantly in mesh with certain of the gears on the intermediate shaft, means for selectively locking said gears on the sleeve to said sleeve, a back gear shaft, two gears fast thereon, a gear mounted fast on the sleeve and constantly in mesh with one of said back gears, a gear loose on the spindle and constantly in mesh with the other back gear, and means for selectively locking the sleeve to the spindle or the gear on said spindle to the same.

8. The combination with a support, of a driving shaft, a cluster of gears splined thereon, an intermediate shaft, a plurality of gears fast thereon, certain of said gears on the intermediate shaft being adapted to separately mesh with the gears of the cluster on the driving shaft, a spindle, a sleeve loosely mounted thereon, two gears loosely mounted on said sleeve and constantly in mesh with certain of the gears on the intermediate shaft, means for selectively locking said gears on the sleeve to said sleeve, a back gear shaft, two gears fast thereon, a gear mounted fast on the sleeve and constantly in mesh with one of said back gears, a gear loose on the spindle and constantly in mesh with the other back gear, a friction clutch carried by said sleeve for locking it to the spindle, a positive clutch element on the gear which is loosely mounted on the spindle, a spool arranged intermediate of said friction clutch and positive clutch element and having coupling means for both on its opposite ends, and means for shifting said spool for selectively locking the sleeve directly to the spindle or the gear on said spindle to the same.

In testimony whereof we have signed our names to this specification in the presence of two attesting witnesses.

RICHARD K. LE BLOND.
WM. F. GROENE.

Witnesses:
GRACE A. PUGH,
IRA INGERSOLL.